July 28, 1964

E. ZIEGER 3,142,114

METHOD OF FILLING FUSED OR BURNT PORTIONS AND CRACKS IN MOLDS, ESPECIALLY INGOT MOLDS, CONSISTING OF CAST IRON OR HEMATITE IRON

Filed Aug. 13, 1962

INVENTOR

Erhard Zieger

By Lowry & Rinehart

ATTYS.

July 28, 1964     E. ZIEGER     3,142,114
METHOD OF FILLING FUSED OR BURNT PORTIONS AND CRACKS IN
MOLDS, ESPECIALLY INGOT MOLDS, CONSISTING
OF CAST IRON OR HEMATITE IRON Filed Aug. 13, 1962     2 Sheets-Sheet 2

INVENTOR
Erhard Zieger
BY
Lowry & Rinehart
ATTYS.

3,142,114
METHOD OF FILLING FUSED OR BURNT PORTIONS AND CRACKS IN MOLDS, ESPECIALLY INGOT MOLDS, CONSISTING OF CAST IRON OR HEMATITE IRON
Erhard Zieger, Wuppertal, Germany, assignor to Gabelin & Co., Dusseldorf, Germany, a firm
Filed Aug. 13, 1962, Ser. No. 216,641
11 Claims. (Cl. 29—402)

This invention relates to the welding of molds which are exposed to high temperatures, and more specifically to a method of filling fused or burnt portions and cracks in molds, especially ingot molds, consisting of cast iron or hematite iron. This method is also applicable for instance to feeder heads, center runners, bottom pouring plates, ingot mold stools, molding cinder pots and similar objects.

It is known to weld cast iron without preheating the base metal. To this end an additional material is introduced which mixes with the cast iron during the welding process. Areas exhibiting different mixture ratios are therefore formed and the carbon contents differ accordingly. The rapid temperature drop when welding has been completed causes the weld to develop a hard porous zone with occlusions of $CO_2$ and the resultant non-uniform structure generates additional stresses. It is also known to weld cold cast iron with Monel metal electrodes. The disadvantage of the first procedure is the undesirable hardness of the weld and that of the latter is the lack of hardness and its high cost.

The object envisaged by the present invention is to provide a method of refilling fused or burnt portions and of repairing cracks in cast or hematite iron molds, especially ingot molds and the like, by welding and of forming an intimate bond between the base metal and the filling for the purpose of reclaiming such molds for further use.

According to the proposed method the application of a bonding layer or buttering of steel and cast iron produced by flashing off cast iron weld rods in the electric arc of a steel electrode ensures an adequate heat transition, whereas conventional pure steel bonding layers undesirably interfere with the transfer of heat when the molds are exposed to the high temperature of a metal poured into the same. The contemplated welding work mainly concerns the reclamation and restitution of the inside walls of ingot molds. When such a mold is filled with a melt, the inside surfaces of the mold accept the temperature of the melt, that is to say a temperature between 1400 and 1600° C. However, on the outside, the mold is exposed to the ambient air so that as a matter of common experience the temperature here is between 500 and 600° C. These temperature levels imply that the wall of the mold is necessarily subject to differential expansion. The material seeks to relieve these high stresses by forming small cracks which extend to a certain depth below the surface. The formation of these cracks may suggest the manner in which a satisfactory repair by welding should be performed in a technologically satisfactory manner.

Contrary to the prevailing opinion that like or similar materials should be combined so that the weld and the base metal will form a substantially homogeneous and integral whole, the method proposed by the invention deliberately sets out to create artificial stress relief gaps which begin in the actual bonding layer or buttering applied to such a recess in the mold wall and extend through each consecutive weld layer upwards through the whole of the weld bead. Build-up welding inside an ingot mold may be effected in mushroom shape with a homogeneous weld joint at the root which, however, is capable of laterally expanding and contracting so as to adapt itself to the conditions which occur in the mold wall when in service.

Another advantage of the method proposed by the invention is that any occlusions of gas, either in the bonding layer or in further superimposed weld layers can escape through the stress relief gaps when the mold becomes hot, thus preventing the weld metal from being forced out by the expanding gases occluded in the interior.

If the recess which has been provided with a buttering or bonding layer is filled with cast iron bars inserted in the manner of a grating or grid, then each individual bar is secured in position by the application of lateral root beads, using a steel electrode. The intervals between these lateral root beads are in this case filled with a first build-up layer from a cast iron rod flashed off in the electric arc of a steel electrode, whereas the further weld layers are applied exclusively by fusing off a cast iron rod serving as electrode.

The insertion of a grid of cast iron bars is advantageous because the inserted metal need not be completely melted down. Moreover, the pools of weld metal are laterally contained and the thermal stress relief gaps are laterally limited. Also, the cooling of the built-up material is retarded because there occurs no considerable lateral chilling by the base metal.

The filling of the recess can be performed with a bare cast iron electrode when direct current is used or it can be performed with a coated cast iron electrode when alternating current is used.

A phenomenon related to the fusing and burning of portions of the surface of ingot molds is the development of cracks in the mold walls. Such deteriorated surface portions often cause the ingot to stick and it is then the practice to loosen the ingot by the application of blows to the mold. When this is done, cracks will form in the mold with scarcely any exception. The usual procedure in the past has been to repair such carcks by pre- and postheating welding methods. However, since such molds may weigh as much as 10 tons and even more, a simple calculation will immediately show that heating such a large mass of material is not economical, and that it is impossible to ensure that absolutely homogeneous welds will be formed.

The invention therefore proposes to weld such cracks without preheating and postheating the base metal by combining the above described process of welding with a mechanical method of effecting repairs, and to apply the two methods to opposite surfaces of the material containing the crack.

The material surrounding the crack on the end and internal wall may be cut out to a depth of about one-third of the thickness of the base material, for instance by cutting it out with a chisel, and the recess thus formed is filled with the aid of an electrode and with cast iron rods in the manner that has been described. On the outside of the mold the cracked wall portion may be covered with a steel cover plate secured thereto which is sufficiently large to be secured to the sound material of the mold. This cover plate may be secured by bolts screwed obliquely into the body of the mold and welded to the cover plate. Preferably the holes for the bolts are drilled in random distribution in such a way that the peripheral edge of the plate can be welded round its edges on to the base metal of the mold. This has the advantage that, when the weld cools, it will shrink and hence cause the cover plate to be pressed firmly against the surface of the mold that is being repaired. The gage of the cover plate may be selected so as to provide the same tensile strength as that possessed by the original wall.

The ideal arrangement would be for the gage of the cover plate to decrease from the edge of the mold to the end of the crack, thus providing a thickness of reinforcing material which corresponds with, or which is proportional to, the stresses which arise in consecutive zones.

In order to prevent lengthening of the crack, the end thereof may be intercepted by a drilled borehole extending about ⅔ through the wall of the mold. Preferably this borehole may be one of the holes serving for fixing the cover plate to the mold.

The cover plate may itself be reinforced in the zone where the crack is widest by welding a strap or supplementary reinforcing plate on to the cover plate. To avoid the creation of gaps when the molds stand side by side on the bottom pouring plate, since these gaps might easily lead to the runner bricks breaking out, it is preferred that the end of the supplementary reinforcing plate be flush with the edge of the mold. The upper edge of the supplementary reinforcing plate may then be welded by forming a V seam. However, in order to avoid the need of turning the mold it is more convenient to burn out a transverse slot in the supplementary reinforcing plate on each side of the crack and therethrough to weld the supplementary reinforcing plate on to the cover plate. Should a crack extend from one side around the radius of a corner into the adjoining side of the mold it is best to divide the reinforcing plate and also to use a thinner gage plate to facilitate adapting the cover plate to the shape of the mold. Additional tie plates may then be provided to reestablish the strength of the mold wall.

Several preferred embodiments of the invention will now be described by way of example and with reference to the accompanying drawings, in which.

Figure 1:
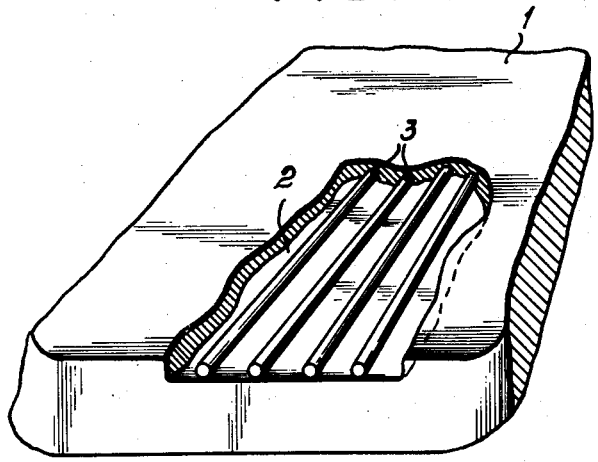
FIG. 1 is a fragmentary perspective view of an ingot mold from the inner surface of which a portion of fused material has been removed, a grid of bars having been placed into the resultant recess.

FIG. 1 shows part of an ingot mold with an internal wall 1 from which a damaged portion has been removed, e.g., by chiseling or using an air hammer so that a recess 2 results which is provided with a bonding layer by coating the floor and sides of the recess 2 without preheating the base material by using a thick gage cast iron weld rod which is flashed off in the electric arc of a steel electrode.

In order to produce a weld which has the least possible characteristic properties of steel, that is to say in order to adapt the properties of the weld so far as possible to the base material and at the same time to obtain a particularly good and homogeneous bonding layer, this bonding layer is produced in the form of alternate juxtaposed mixed structure beads of cast iron and steel and pure cast iron beads, the mixed structure beads being applied by flashing off the cast iron rod in the electric arc of the steel electrode and the pure cast iron bead being applied by utilising the heat derived from the immediately preceding application of the mixed structure bead.

Figure 2:
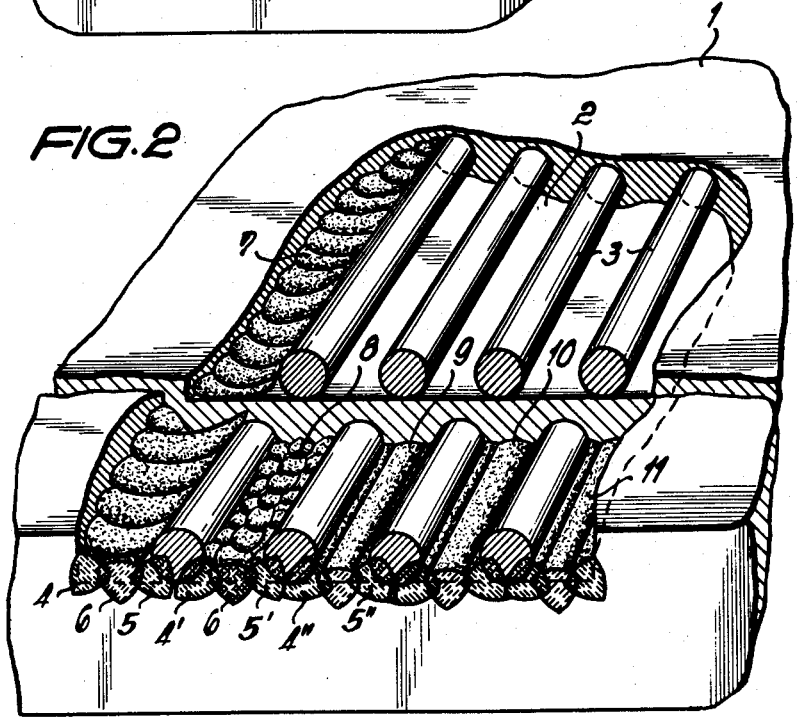
FIG. 2 is a similar view on a larger scale, schematically indicating the manner of applying weld beads.

The recess 2 which has thus been buttered is then filled in consecutive rows either exclusively by welding with a thick gage cast iron electrode rod carrying a current of about 650 amps., or in combination with cast iron bars 3 which are inserted in the recess 2 in the form of a grid. When such a grid is used, the cast iron bars 3 between which there remain free fields are welded into position by lateral root beads 4 and 5, 4' and 5' and 4" and 5", as shown in FIG. 2. When all the cast iron bars 3 have been secured in the recess 2 a first build-up welding bead 6 is applied which at the same time connects the two lateral root beads 4 and 5. This is done by using a live steel electrode and simultaneously flashing off a cast iron rod which carries no current. The fields between the cast iron bars 3 are then filled with build-up welding layers 7 to 11 until the metal has been built up to the original surface of the internal wall of the mold, this being done solely by flashing off in the electric arc a cast iron rod used as an electrode. The build-up welding process is deliberately interrupted after the first layer has been applied in order to generate thermotechnical stress relief gaps which, controlled by the magnitude of the current and in the case of an inserted grid also by the size of the cast iron bars 3, extend at equidistant intervals in parallel through the whole of the layer perpendicularly to the weld bead or perpendicularly to the inserted cast iron bars 3. Build-up welding inside an ingot mold is effected in mushroom shape with a homogeneous weld joint at the root which, however, is capable of laterally expanding and contracting so as to adapt itself to the conditions which occur in the mold wall when in service.

The filling of the recess 2 can be performed with a bare cast iron electrode when direct current is used and with a coated cast iron electrode when alternating current is used.

Figure 3:
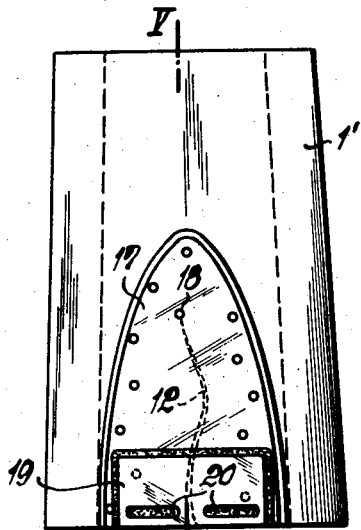
FIG. 3 is a side elevation of an ingot mold which exhibits a crack, externally repaired by the application of a cover plate and a supplementary reinforcing plate or strap.
Figure 4:
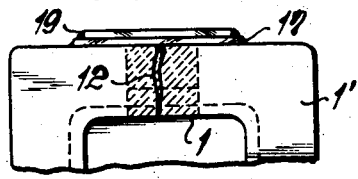
FIG. 4 is a fragmentary view of the ingot mold according to FIG. 3, seen from above.
Figure 5:
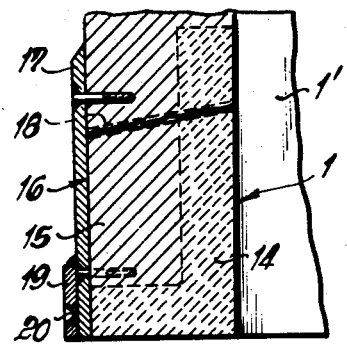
FIG. 5 is a section taken on the line V—V of FIG. 3.

FIGS. 3 to 5 represent an ingot mold 1' with a single crack 12 extending from the floor upwardly on one side wall of the mold and requiring repair. Approximately ⅓ of the thickness of the material together with the crack is chiseled out of the internal wall 1 of the mold 1' to form a recess 14. The recess 14 then is filled by the aforedescribed method of welding. A cover plate 17 the gage of which is selected so as to provide the same tensile strength as that possessed by the original internal wall 1 of the mold 1' and which covers the entire area of the crack is then secured to a portion 15 of sound material on the outside surface 16 of the mold 1' by means of bolts screwed obliquely into the base metal of the mold in irregular distribution and welded into the cover plate 17. The end of the crack 12 is preferably intercepted by drilling a borehole 18.

At the point where the crack 12 gapes widest a supplementary reinforcing plate 19 is applied which is fixed by laying a weld bead round three sides thereof and into appropriate slots 20 provided at the fourth side of the supplementary reinforcing plate 19 and on both sides of the crack 12.

Figure 6:
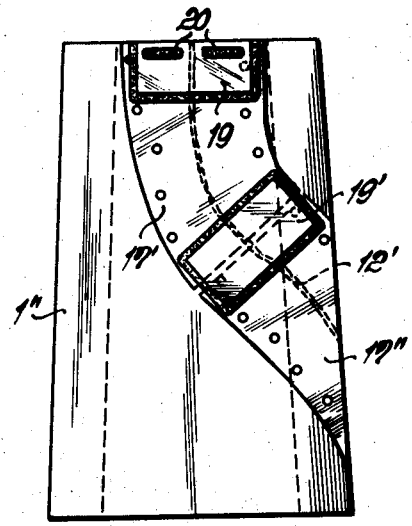
FIG. 6 is a side elevation of an ingot mold with a crack which extends across two sides of the mold.

FIG. 6 illustrates a more lengthy crack 12' extending across two sides of a mold 1". Since in such a case the cover plate would have to be bent in two directions to follow the course of the crack 12', a procedure which would not be economical, the cover plate is divided into sections 17', 17". The butt joints between these cover plate sections are welded to additional tie plates 19'. The crack 12' itself is chiseled out on the internal wall 1 of the mold 1' and treated in the manner initially described.

Figures 7, 7A:
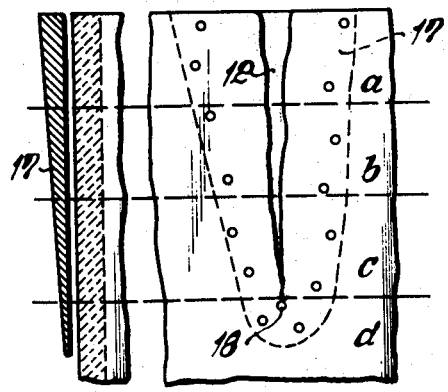
FIG. 7 is a schematic side view of part of an ingot mold with a crack exaggerated in width.
FIG. 7a is a side elevational view of a suitable cover plate shown in longitudinal section.

Since a crack in a mold creates zones of differing stress, as schematically indicated in FIG. 7, the gage of the cover plate is adapted to the differing zones.

FIG. 7 illustratively shows zones $a$ to $d$ in which the stress decreases from $a$ to $d$. The cover plate 17 therefore decreases in section according to the approximate decrease in stress from the point of maximum gape to the end of the crack, as shown in FIG. 7a. Material and weight can thus be saved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A method of filling fused or burnt portions and cracks in molds, especially ingot molds, consisting of cast iron or hematite iron, which comprises the steps of removing the damaged or burnt material thereby producing a recess, coating the floor and sides of the recess without preheating the base material by using a thick gage cast iron weld rod which is flashed off in the electric arc of a steel electrode, filling by build-up welding the recess thus provided with a bonding layer in consecutive rows by welding with a thick gage cast iron rod serving as an electrode, the welding process being temporarily deliberately interrupted after a first layer has been built up, in order to generate thermotechnical stress relief gaps which, controlled by the magnitude of the current, extend at equidistant intervals in parallel through the whole of the layer perpendicularly to the built-up weld beads.

2. A method as claimed in claim 1, wherein cast iron bars are inserted in the manner of a grating or grid into the recess provided with the bonding layer and to which bonding layer the cast iron bars are secured by lateral root beads, whereupon the remaining free space of said recess is filled by build-up welding using a thick gage cast iron rod as electrode, thereby partially melting down the inserted cast iron bars, the welding process being temporarily deliberately interrupted after a first layer has been built up, in order to generate thermotechnical stress relief gaps which, controlled by the magnitude of the current and the size of the inserted cast iron bars, extend at equidistant intervals in parallel through the whole of the layer perpendicularly to the built-up weld beads and said cast iron bars.

3. A method as claimed in claim 1, wherein the bonding layer is produced in the form of alternate juxtaposed mixed structure beads of cast iron and steel and pure cast iron beads, the mixed structure beads being applied by flashing off a cast iron rod in the electric arc of a steel electrode and the pure cast iron bead being applied by utilising the heat derived from the immediately preceding application of the mixed structure bead.

4. A method as claimed in claim 1, wherein a crack in a mold wall is welded on the internal surface of the cracked part of the mold, whereas the external surface of the cracked part of the mold is repaired with mechanical means.

5. A method as claimed in claim 4, wherein the crack on the end and internal wall of the mold is cut out to about one third of the thickness of the base material and the resultant recess is filled by said welding process, and a cover plate made of steel is then secured to the sound material on the outside of the mold across the weld.

6. A method as claimed in claim 5, wherein the cover plate is secured by means of bolts screwed obliquely into the base metal of the mold in irregular distribution and welded to the cover plate.

7. A method as claimed in claim 6, wherein a borehole is provided to intercept the end of the crack, said borehole serving for the reception of one of the bolts for securing the cover plate to the sound material of the mold.

8. A method as claimed in claim 5, wherein the gage of said cover plate decreases from the edge of the mold to the end of the crack to correspond with the decreasing width of the crack.

9. A method as claimed in claim 5, wherein over the cover plate a supplementary reinforcing plate extending across the wide end of the crack is secured to the cover plate, said supplementary reinforcing plate having two transverse slots adapted to take up respective weld beads.

10. A method as claimed in claim 5, wherein the cover plate is divided into a plurality of cover plate portions arranged adjacent one another on a crack extending across two sides of a mold.

11. A method of filling a recess in the inside surface of an ingot mold or the like, said mold consisting essentially of cast iron, comprising the steps of welding onto the free face of said recess a relatively thin bonding layer of cast iron and steel; and forming successively and intermittently in the residual recess a plurality of cast iron welding layers so as to substantially fill said recess and in such a manner that each of the thus applied cast iron welding layers is permitted to cool until stress relief gaps are formed therein extending throughout the height of the respective cast iron welding layer, prior to forming the next one of the successively formed cast iron welding layers.

References Cited in the file of this patent

UNITED STATES PATENTS 2,075,810 George _____ Apr. 6, 1937

FOREIGN PATENTS 802,946 Great Britain _____ Oct. 8, 1958